Feb. 23, 1937.    C. C. FARMER    2,071,737
MAGNETIC TRACK BRAKE CONSTRUCTION
Filed Oct. 17, 1935
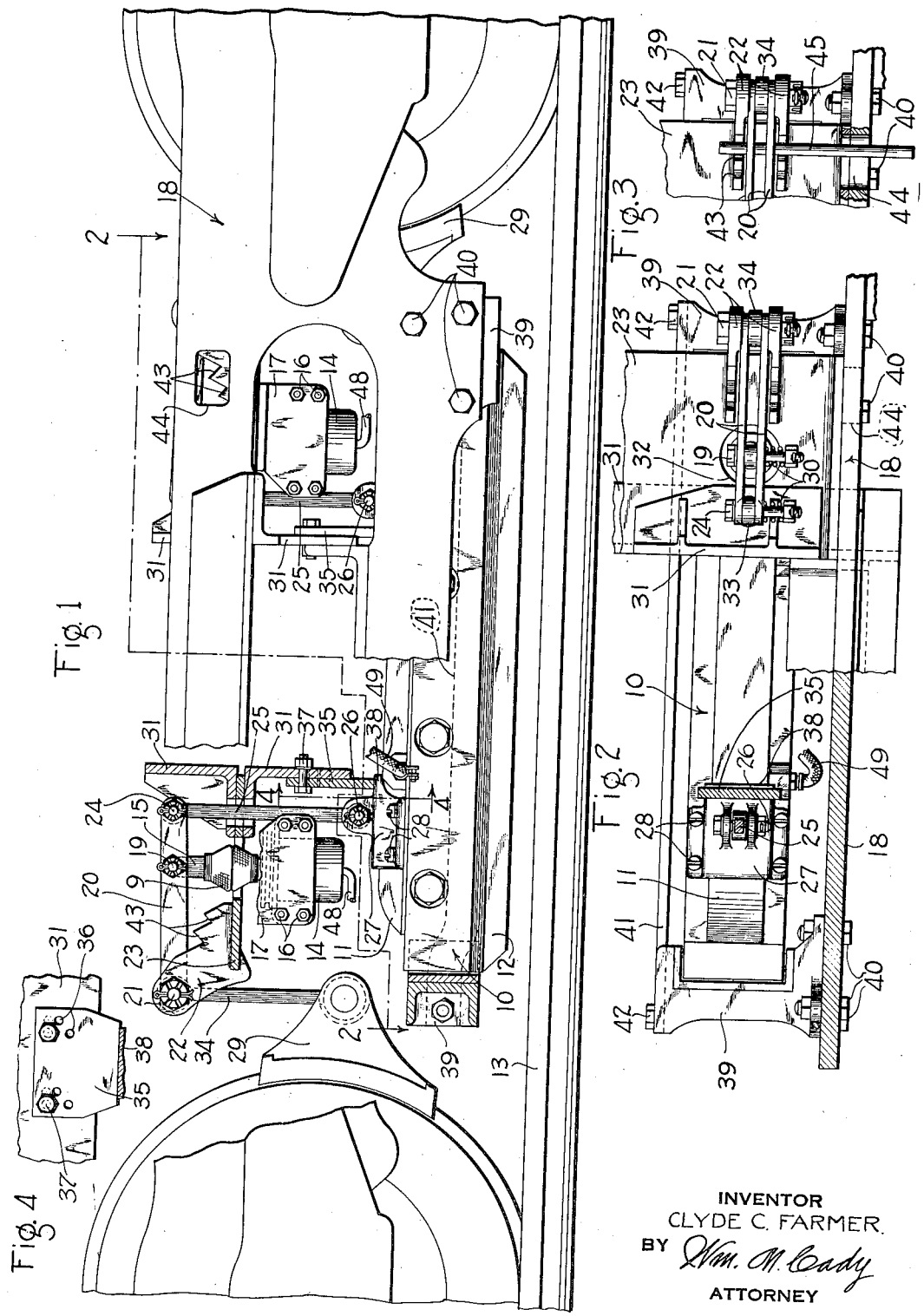
INVENTOR
CLYDE C. FARMER.
BY Wm. M. Cady
ATTORNEY Patented Feb. 23, 1937

2,071,737

UNITED STATES PATENT OFFICE 2,071,737

MAGNETIC TRACK BRAKE CONSTRUCTION

Clyde C. Farmer, Pittsburgh, Pa., assignor to The Westinghouse Air Brake Company, Wilmerding, Pa., a corporation of Pennsylvania Application October 17, 1935, Serial No. 45,385

11 Claims. (Cl. 188—165)

This invention relates to magnetic track brake construction, and in particular to magnetic track brakes for railway trains and traction vehicles.

In brake systems employing magnetic track brakes in which the track brake devices are held above the track rails in their release or inoperative position and lowered to the rails in their operative or application position, it is desirable that the track brake devices be maintained in their release or inoperative position by some form of control means so arranged that if through accident the control means should become inoperative the magnetic track brake devices would be automatically lowered to engagement with the track rails and thereby be effective to brake the train or vehicle.

In normal operation of a preferred type of such brake systems fluid at a predetermined pressure is supplied to fluid pressure operated raising means to maintain the magnetic track brake devices suspended in their release position above the track rails, and when it is desired to apply the magnetic track brakes the pressure of fluid thus supplied is diminished or released to the atmosphere so as to permit the track brake devices to drop, due to gravity effect, to engagement with the rails. This type of control inherently embodies safety principles, as will be obvious, because when accidents occur such as to cause a loss of fluid pressure the track brake system may still be applied and thus insure stopping of the train or vehicle.

Accordingly, therefore, it is a principal object of the present invention to provide a magnetic track brake construction which embodies the safety principles hereinbefore referred to.

In certain types of modern railway vehicles the vehicle trucks are so constructed that the space provided for installation of magnetic track brakes is limited. It is exceedingly difficult therefore in many instances to adapt a magnetic track brake system, embodying the safety principles hereinbefore referred to, to such types of vehicle trucks. A further object of this invention is to provide a magnetic track brake construction of the safety type which is particularly well adapted for installation on vehicle trucks providing only a limited space for such installation.

When the fluid pressure control for controlling raising of the track brake devices is rendered ineffective, and the track brake devices thus drop to engagement with the rail, it is desirable that some simple arrangement be provided whereby the track brake devices may be temporarily mechanically suspended above the rails until the fluid pressure control has been restored. It is a yet further object of the invention to provide a magnetic track brake construction providing for temporary mechanical suspension of the track brake devices above the track rails, which mechanical suspension may be effected in a ready and simple manner.

Other objects of the invention dealing with specific constructions and arrangement of parts will be more fully understood from the following description of one embodiment of the invention, which is taken in connection with the attached drawing, wherein Fig. 1 shows a side elevation of the embodiment as adapted to a traction vehicle type of truck.

Fig. 2 is a top plan view taken along the line 2—2 of Fig. 1.

Fig. 3 is a fragmentary view of a portion of the structure shown to the right in Fig. 2, indicating how by insertion of a metallic rod or bar the track brake device may be mechanically suspended above a track rail.

Fig. 4 is a fragmentary view taken along the line 4—4 of Fig. 1.

In the embodiment shown, a magnetic track brake device is indicated generally at 10 as having a winding 11 suitably insulated from the frame parts of the track brake device and adapted when energized to magnetize rail-engaging shoes 12.

For raising the track brake device 10 and for maintaining it in raised position above a track rail 13, there are provided two fluid pressure cylinders 14, disposed directly above the track brake device 10. Each of these cylinders is provided with a piston (not shown) having connected thereto a piston rod 15 which is partially encased in a flexible dust guard 9, such as is common practice in systems of this type.

Each of the cylinders 14 is secured by bolts 16 to a bracket 17 depending from a part of a vehicle truck frame 18. The truck frame 18 is preferably an unsprung portion, so that the raising cylinders 14 will maintain a relatively fixed relation with respect to the track rail 13.

The piston rod 15 associated with each raising cylinder 14 is connected to and between a pair of arms 20 intermediate their ends by a bolt 19. One pair of ends of each of the two arms 20 is pivotally supported by a bolt 21 carried by two ears or lugs 22 secured to or integral with a plate 23 forming a part of the unsprung truck frame 18. The other pair of ends of each of the arms 20 is pivotally connected by a bolt 24 to one end of a link 25 which is at its other end pivotally connected to the track shoe device 10 through another bolt 26 and bracket 27. The bracket 27 may be secured to the track brake device 10 by machine screws 28.

In the connections between the piston rod 15 and the two arms 20, and between the ends of the two arms 20 and the link 25, are suitably arranged springs 30 which serve to maintain the contacting parts in firm securing relation, so as to prevent undue rattling caused by wear.

The supporting plate 23 may be secured between two transverse angle members 31, forming parts of the truck frame 18, and when so arranged is provided with an enlarged aperture 32 through which the piston rod 15 works, and at the connection between the plate 23 and the flanges of the two angle members 31, is provided with a smaller aperture 33, through which the link 25 works.

In addition to pivoting the two arms 20 about the bolt 21 a hanger 34, which supports a wheel brake shoe 29, may be also pivoted, thus providing a compact and simple arrangement of wheel brake and track brake parts. It is to be here understood, however, that functioning of the magnetic track brakes is in no wise dependent upon functioning of the wheel brakes.

The height to which the track brake device 10 may be suspended above the track rail 13 is governed by adjustable stops 35. These stops are provided with a plurality of bolt holes 36 through which may pass bolts 37 to bolt the stops to the lower transverse angle members 31. As will be obvious, by selecting the proper bolt holes the track shoe device 10 may be held suspended above the track rails different distances. When the track brake device is raised a tongue 38 formed integrally with each bracket 27 engages the lower edge of a stop 35.

When the track brake device 10 is in engagement with the track rail 13 and the winding 11 is energized, the braking thrust produced is transmitted to the truck frame 18 through one or the other of guides 39. Each of these guides is bolted to the truck frame 18 by means of bolts 40, and the unattached ends of the two guides are connected by a bar 41 which serves as a guard for the track brake device 10. This bar or guard 41 may be bolted to the two guides 39 by means of bolts 42. The guides 39 are so shaped, as shown in Fig. 2, as to embrace the ends and a portion of the sides of the track brake device 10, and thus serve to guide the upward and downward movement of the track brake device. In order that the track brake device may be mechanically suspended above the track rail when fluid pressure is exhausted from the raising cylinders 14, each of the ears 22 is provided with notches 43, and the side walls of the truck frame 18 are apertured adjacent these notches as shown at 44, so that a small rod or bar 45 may be passed therethrough and under the arms 20 so as to rest in the notches 43 of the two adjacent ears or lugs 22. In this position the rod or bar 45 prevents the arms 20 from moving downwardly, so that the track brake device 10 is maintained suspended above the rail.

Operation

When the track brake is in release, the winding 11 of the track brake device 10 is maintained deenergized and fluid at a chosen pressure is supplied to the two raising cylinders 14 by way of pipe 48. So long as the pressure of this fluid is maintained above a chosen or predetermined value, the piston in each cylinder will be maintained in its upper position, and the parts connecting each piston rod 15 to the track brake device 10 will be positioned as shown in Fig. 1. The track brake device 10 will thus be held in its upper or release position against the two stops 35.

When it is desired to apply the track brakes, fluid under pressure in the two raising cylinders 14 is released to the atmosphere and since the force suspending the track brake device due to the fluid pressure in cylinders 14 will rapidly diminish to zero, the track brake device will drop to engagement with the track rail 13 due to the action of gravity. At or about the same time current is supplied to the winding 11 to the desired degree by way of cable 49. The rail engaging shoes 12 will thus be magnetized and produce a braking effect on the track rail 13. This braking effect will be transmitted to the vehicle through one or the other of the guides 39, depending upon the direction of travel of the vehicle. The wheel brakes, of course, may or may not be applied at the same time, depending upon the desired degree of braking.

To release the track brakes, fluid under pressure is again supplied to the two raising cylinders 14 and at the same time the winding 11 is deenergized. The track brake device 10 will then be raised to its release or inoperative position.

If, now, while the vehicle is running, the pressure of fluid in the two raising cylinders 14 should be diminished accidentally, due to a broken pipe or a leak in the system, then the track brake device 10 would drop to the rail. The winding 11 at this time may not be energized, but the operator would in all probability "feel" the drag of the track brake device on the rail and immediately investigate the cause.

If, however, the operator was not aware of the loss of fluid pressure and in the regular course of operation initiated an application of the brakes, the magnetic track brake would be as effective as under normal conditions and the train or vehicle would, of course, be brought to a stop as during normal operation. Therefore, even though there should be a failure of the raising mechanism, due to a loss of fluid pressure, the magnetic track brakes would still be operative.

When the magnetic track brake raising mechanism has been rendered inoperative, and it is desired to maintain the track brake device raised so that the car or train may be moved, the track brake device may be jacked up by any suitable means and then a rod or bar 45 inserted through the aperture 44 in the truck frame 18, so as to rest in the notches 43 and maintain the arms 20 in their uppermost position. The track brake device is thus mechanically maintained suspended and will not interfere with normal movement of the vehicle. The vehicle may be then brought to a convenient repair station.

It will thus be seen that I have provided a magnetic track brake construction of compact and simple design embodying preferred safety features, and at the same time providing for mechanically maintaining the track brake devices suspended above the rails upon failure of the regular suspending means.

While I have illustrated my invention with reference to one particular embodiment thereof, it is not my intention to be limited to the specific details shown, nor otherwise than by the spirit and scope of the appended claims.

Having now described my invention, what I claim as new and desire to secure by Letters Patent, is:

1. In a magnetic track brake system, in combination, a magnetic track brake device for engaging a track rail, a link connected to said track brake device and extending upwardly therefrom, an arm connected at one end to said link and pivotally mounted at its other end on a support, and a raising cylinder having a movable abutment therein connected to said arm intermediate its ends.

2. In a magnetic track brake system, in combination, a magnetic track brake device for engaging a track rail, a plurality of elements pivotally connected to said track brake device and extending upwardly therefrom, a plurality of arms each of which is pivotally mounted at one end on a support and connected at the other end to one of said elements, and a plurality of fluid pressure operated devices each of which is operatively connected to and adapted to actuate one of said arms.

3. In a magnetic track brake system, in combination, a magnetic track brake device for engaging a track rail, a link connected at one end to said track brake device, an arm pivotally mounted at one end on a support and pivotally connected at the other end to said link, a fluid pressure operated device connected to said arm and adapted to actuate said arm when fluid under pressure is supplied to said device, and means for guiding movement of said track brake device and also adapted to transmit the braking effect produced by said device to an associating vehicle.

4. In a magnetic track brake system, in combination, a vehicle truck, a magnetic track brake device for engaging a track rail, an arm pivotally connected to said truck at one end and connected at the other end to said track brake device, and fluid pressure operated means connected to said arm intermediate its ends and adapted to actuate said arm to raise said track brake device above a track rail.

5. In a magnetic track brake system, in combination, a vehicle truck, a magnetic track brake device, a plurality of arms each of which has one end thereof pivotally mounted on said truck and the other end thereof pivotally connected to said track brake device, and a plurality of fluid pressure operated devices mounted on said truck above said track brake device each of which is connected to one of said arms intermediate its ends and adapted when fluid under pressure is supplied thereto to effect raising of said track brake device above a track rail.

6. In a magnetic track brake system, in combination, a magnetic track brake device for engaging a track rail, an arm pivotally mounted at one end and secured at the other end to said track brake device, a fluid pressure operated device for actuating said arm to a position to maintain said track brake device raised above a track rail, and means providing for mechanically maintaining said arm in said position upon failure of said fluid pressure operated device.

7. In a track brake system, in combination, a magnetic track brake device for engaging a track rail, an arm pivotally mounted at one end to a rigid body and pivotally mounted at its other end to said track brake device, a fluid pressure operated device connected to said arm and adapted to raise said arm to an upper position to maintain said track brake device in a raised position above a track rail, and means providing for the manual insertion of an element beneath said arm to maintain said arm in said raised position upon release of fluid under pressure from said fluid pressure operated device.

8. In a vehicle brake system, in combination, a vehicle truck, a magnetic track brake device for engaging a track rail, an arm pivotally connected to said truck at one end thereof and pivotally connected at the other end thereof to said track plate device, a fluid pressure operated device having a piston therein operatively connected to said arm for actuating said arm to an upper position to maintain said track brake device suspended above a track rail, and means associated with said arm for receiving an element manually placed therewith for maintaining said arm in said raised position upon release of fluid under pressure from said fluid pressure operated device.

9. In a magnetic track brake system, in combination, a magnetic track brake device for engaging a track rail, fluid pressure operated means operable when fluid under pressure is supplied thereto to raise said track brake device above a track rail, and an adjustable stop for limiting the upward movement of said track brake device, said stop being adapted to be attached to a portion of the vehicle truck frame in different positions to provide for different degrees of upward movement of said track brake device.

10. In a magnetic track brake system, in combination, a magnetic track brake device for engaging a track rail, an arm adapted to be pivotally connected at one end to the truck frame and to be attached to the track brake device at the other end, fluid pressure operated means for actuating said arm, and an adjustable stop for governing the degree of movement of said track brake device when said arm is actuated by said fluid pressure operated means.

11. In a magnetic track brake system, in combination, a vehicle truck having a side frame and a transversely extending member, a magnetic track brake device, a plurality of arms each of which has one end thereof pivotally mounted on said transverse member and the other end thereof pivotally connected to said track brake device, a plurality of fluid pressure operated devices each of which is connected to one of said arms intermediate its ends and adapted when fluid under pressure is supplied thereto to effect raising of said track brake device above a track rail, brackets secured to said truck side frame for supporting said fluid pressure operated devices above said track brake device and below said transverse member, and guiding means attached to said truck side frame for guiding said track brake device.

CLYDE C. FARMER.